Patented Dec. 13, 1932

1,891,091

UNITED STATES PATENT OFFICE

THOMAS J. HEADLEE, OF DAYTON, AND JOSEPH M. GINSBURG, OF NEW BRUNSWICK, NEW JERSEY, ASSIGNORS TO TOBACCO BY-PRODUCTS & CHEMICAL CORPORATION, OF LOUISVILLE, KENTUCKY, A CORPORATION OF DELAWARE

INSECTICIDE SPRAY

No Drawing. Application filed January 31, 1931. Serial No. 512,744.

This invention relates to a new insecticide spray. It relates particularly to such a spray serving as a stomach poison as well as a contact poison.

It has long been known that an insecticide spray containing nicotine was highly efficient as a contact spray, that is to say a spray suitable for killing sucking insects as distinguished from chewing insects. However, nicotine either free or in the compounds heretofore employed is volatile and very soluble, so that such sprays did not remain on the plant for a length of time sufficient to serve as effective stomach poisons for chewing insects.

The object of the present invention is to provide an insecticide spray comprising a nicotine compound which will not volatilize readily and will be much less soluble, and, therefore, will remain on the plant for a sufficient length of time to serve as a stomach poison, but which will disappear eventually and leave the plants treated free from undesirable residue such as accumulates when arsenicals are used.

With this general object in view, the invention consists in an insecticide spray comprising nicotine tannate, which we have found to be sufficiently slow in giving up its nicotine, or being dissolved by rain or dew, that when applied to a plant it will remain for some time, and so poisonous or so distasteful to chewing insects that the plant will be protected against them for a reasonable time.

Incidentally, of course, any of the spray which may contact with sucking insects will tend to kill them, and the nicotine vapors which are slowly evolved from the nicotine tannate will be offensive to sucking insects, so that they are kept away from the plant so long as any appreciable amount of nicotine tannate remains on the plant.

While the nicotine tannate can be made in advance of its use as a spray, either in powder or paste form, we have found that one of the advantages of the invention is that the combination of the nicotine with the tannic acid may be brought about when mixing the spray materials, thereby avoiding the expense of separate special manufacture in advance and also avoiding the losses due to storage of nicotine compounds, or the cost of sealed containers.

An insecticide spray made in accordance with the invention comprises nicotine tannate in a liquid in which the nicotine tannate is insoluble. Usually water is employed as the liquid, particularly where the nicotine tannate is not prepared in advance.

As one example of an insecticide spray comprising the invention the following is submitted:

In the spray tank of an ordinary sprayer having an agitator in the tank, put about 25 gallons of water. Then, with the agitator running, sift in about two pounds of tannic acid; then while continuing the agitation pour in slowly, one pound (one pint) of free nicotine solution of about 50% strength, such, for example, as the free nicotine solution sold on the market under the trade name Black Leaf 50. Add water sufficient to make the total 100 gallons, the agitator being still maintained in operation. The nicotine combines with its equivalent of tannic acid to form the nicotine tannate. The resultant spray liquid contains nicotine to the extent of about .06 per cent.

It is to be understood that other materials may be added to the above described spray, so long as such other materials do not react with the nicotine tannate. I have found that syrup or neutral fish oil may be added to the spray in the tank to serve as stickers and spreaders without affecting the solubility of the nicotine tannate.

An insecticide spray made in accordance with the present invention has been found to be highly efficient against chewing insects and particularly against the slugs of the Colorado potato beetle, the fall web worm, the Mexican bean beetle, and the codling moth. Also, it is highly efficient against sucking insects, such as apple leafhoppers.

An important advantage of this invention is that when sprayed on fruit trees during the fruiting season, the water will evaporate and leave on the fruit a protective coating poisonous to insects, which slowly evolves its nicotine and eventually disappears from the fruit, so that about twenty days after spraying the fruit will be free from poison and hence may be used safely for food purposes.

Where other forms of stomach poison insecticides, such as the arsenates are used on fruit, the poison remains on the fruit and hence the latter must be subjected to washing processes involving the use of acid, to remove the poison before the fruit is fit for the market. This is avoided by the present invention.

While we have above particularly referred to the use of nicotine tannate as particularly advantageous in forming an insecticide efficient against chewing insects, we have found that nicotine silicotungstate may be used instead of nicotine tannate with about as good effect but on account of the greater cost of the silicotungstic acid the nicotine tannate is best for general use.

We have also found that other substances, somewhat similar to nicotine in their chemical composition, such as pyridines, piperidines piperazines, pyrrolidines and like compounds when combined with tannic acid are equally efficient against chewing insects and may be used instead of nicotine tannate.

What we claim is:

1. A stomach and a contact poison insecticide, consisting of a chemical combination of tannic acid and nicotine, known as nicotine tannate.

2. Stomach poison insecticide consisting of chemical compounds of tannic acid with one of the class of pyridines, piperidines, piperazines, and pyrrolidines.

3. An insecticide spray material comprising water, nicotine tannate and a small excess of free tannic acid.

4. An insecticide spray material comprising water and nicotine tannate in the proportion of about .06 per cent nicotine.

In testimony whereof, we have hereunto set our hands.

THOMAS J. HEADLEE.
JOSEPH M. GINSBURG.